United States Patent [19]
Callison et al.

[11] Patent Number: 5,721,839
[45] Date of Patent: Feb. 24, 1998

[54] APPARATUS AND METHOD FOR SYNCHRONOUSLY PROVIDING A FULLNESS INDICATION OF A DUAL PORTED BUFFER SITUATED BETWEEN TWO ASYNCHRONOUS BUSES

[75] Inventors: Ryan A. Callison, Spring; Gregory T. Chandler, Houston, both of Tex.

[73] Assignee: Compaq Computer Corporation, Houston, Tex.

[21] Appl. No.: 542,882

[22] Filed: Oct. 13, 1995

[51] Int. Cl.[6] .................................................. G06F 18/00
[52] U.S. Cl. .................. 395/308; 395/309; 395/872; 395/877; 395/426; 395/250
[58] Field of Search .......................... 395/308, 309, 395/872, 877, 822, 281, 250, 476, 876, 875

[56] References Cited

U.S. PATENT DOCUMENTS

| | | | |
|---|---|---|---|
| 5,355,455 | 10/1994 | Hilgendorf et al. | 395/325 |
| 5,434,996 | 7/1995 | Bell | 395/285 |
| 5,471,585 | 11/1995 | Barakat et al. | 395/308 |
| 5,499,346 | 3/1996 | Amini et al. | 395/308 |
| 5,517,650 | 5/1996 | Bland et al. | 395/750 |
| 5,517,665 | 5/1996 | Sprague et al. | 395/308 |
| 5,535,341 | 7/1996 | Shah et al. | 395/306 |
| 5,557,758 | 9/1996 | Bland et al. | 395/308 |
| 5,561,820 | 10/1996 | Bland et al. | 395/846 |
| 5,581,714 | 12/1996 | Amini et al. | 395/308 |

OTHER PUBLICATIONS

"intel. 82375EB/82375SB PCI-EISA Bridge (PCEB) Advance Information", Copyright © Intel Corporation, 1995 (Apr., 1993) (pp. 211-344).

"PCI Local Bus—Host Bridge Architecture"; Chapter 3; Revision 1.0; Copyright © 1993 PCI Special Interest Group (Sep. 8, 1993) (pp. 3-1 – 3-24).

"PCI Local Bus—Bridges From PCI to Standard Buses"; Chapter 4; Revision 1.0; Copyright © 1993 PCI Special Interest Group (Sep. 8, 1993) (pp. 4-1 – 4-4).

Primary Examiner—Jack B. Harvey
Assistant Examiner—Ario Etienne
Attorney, Agent, or Firm—Pravel, Hewitt, Kimball & Krieger

[57] ABSTRACT

A bridge for coupling two buses together utilizes a data buffer to act as a point of synchronization to provide effective data operations between the buses. The data buffer includes a number of dual ported memories for write posting and read ahead operations. The data buffer further includes address incrementing and comparison circuitry to synchronize the flags into the clock domain of each bus.

20 Claims, 13 Drawing Sheets

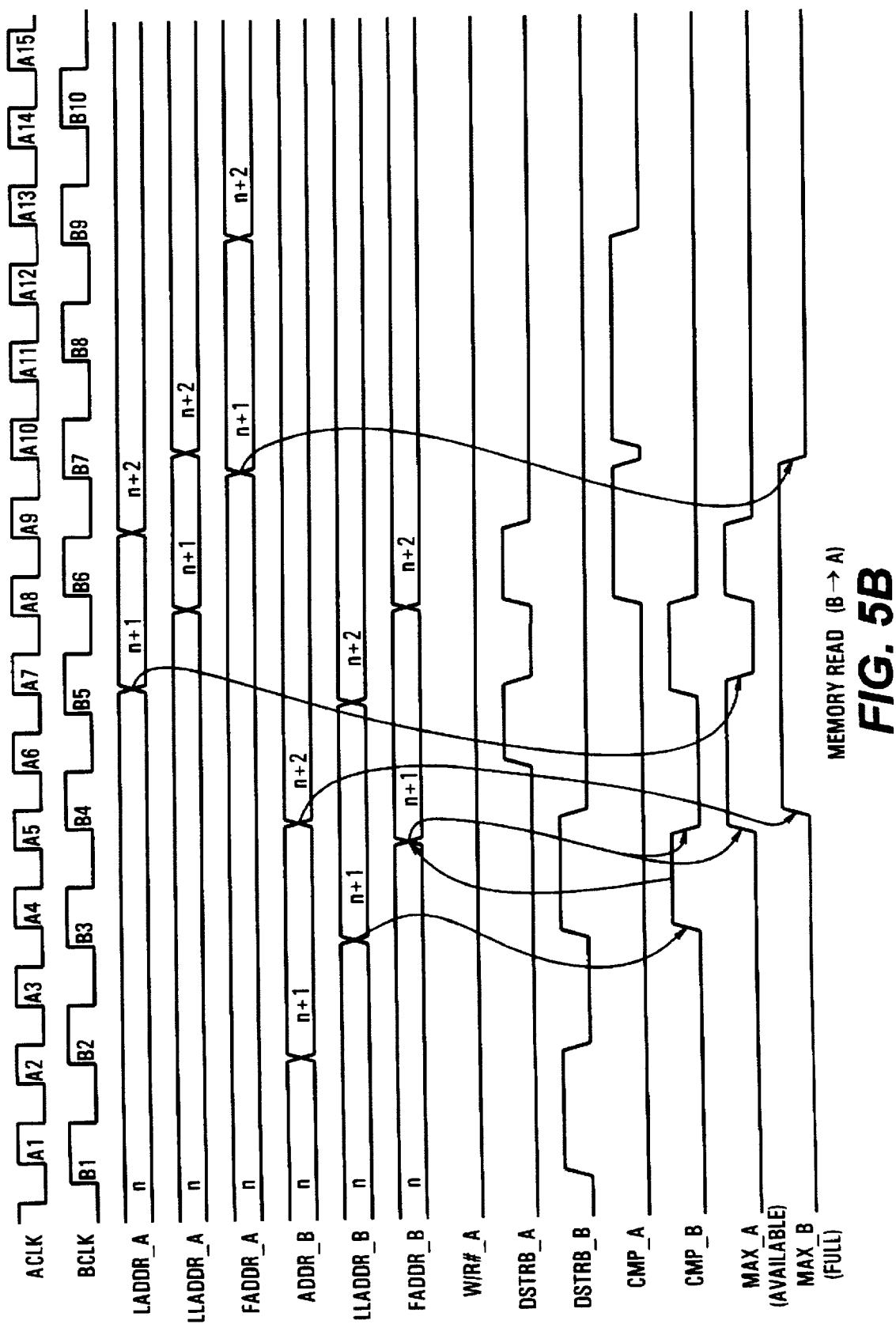
FIG. 5B  MEMORY READ (B → A)

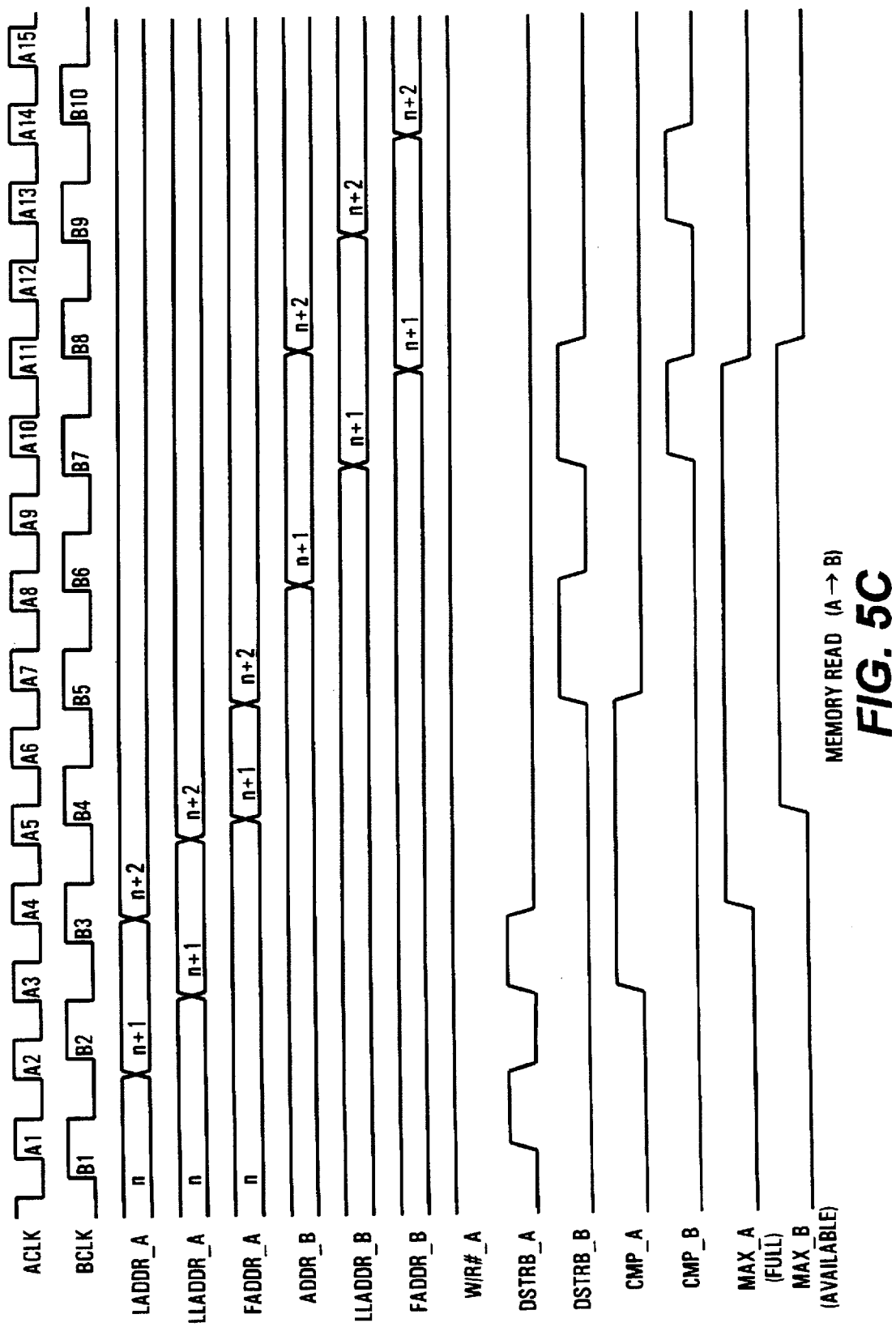
FIG. 5C MEMORY READ (A → B)

APPARATUS AND METHOD FOR SYNCHRONOUSLY PROVIDING A FULLNESS INDICATION OF A DUAL PORTED BUFFER SITUATED BETWEEN TWO ASYNCHRONOUS BUSES

BACKGROUND OF THE INVENTION

1. Field of the Invention

The invention relates to a bridge apparatus and method for translating operations from one bus to another bus and more particularly to the synchronization of data and control from one clock domain to another.

2. Description of the Related Art

Personal computers are constantly changing as new technologies evolve and are incorporated into the computer. Performance improvements in the microprocessor and memory have resulted in computers so powerful that they are now capable of performing tasks that before could only be performed by large mainframe computers. However, to fully replace a mainframe computer, the computer must have significant memory and storage capacity supported by a hearty I/O (input/output) subsystem.

Several standardized I/O buses are available to the system designer including: ISA (Industry Standard Architecture); EISA (Extended Industry Standard Architecture); and PCI (Peripheral Component Interface). Today's computers are typically designed with some combination of the three. For moving data between the buses, a bridge device is typically provided.

The bridge device connects to both buses for transferring data between the buses and translating the bus control signals. The buses can be different, or especially in the case of PCI, the bridge can simply provide an electrical extension to the same logical bus. This electrical separation makes it possible to meet the PCI bus requirement of limiting the number of physical devices on one bus segment, while at the same time not limiting the total number of PCI agents. In PCI bus vernacular, an agent is the term denoting the class of devices connecting to the bus, including master and slave devices.

One such device is the Intel PCI to EISA bridge chip set. The 82375EB/SB PCI-EISA Bridge and the 82374EB/SB EISA system component work in tandem to provide an EISA I/O interface for computers having a PCI bus. The chip set can be either a master or slave on both the PCI and EISA buses. For PCI to EISA data transfers, four 32-bit posted write buffers are provided to enhance single cycle PCI bus transactions. For EISA to PCI data transfers, four 16-byte line buffers are included to support EISA bursting.

In order to use both buses efficiently, most bridges implement some amount of data buffering within the bridge itself. This allows the bridge to de-couple the buses from each other and let each bus run at its maximum speed without being slowed down by the other. There are generally two types of buffers that may be implemented in a bridge: write posting buffers and read prefetch or read ahead buffers. Both types can be implemented on either bus.

Write posting buffers accept write data from one bus and acknowledge reception to that bus. This frees the bus to perform other transactions. The bridge temporarily stores, or posts, the write data until it can be written to the other bus. Read prefetch buffers take the address from a single read access and read additional data speculating that it will also be needed. The bridge then holds that data in a buffer until it is either unusable or it is used by a read access.

In the Intel chip set, the buffer permits short bursts at peak data transfer rates. For example, if a EISA device requests data from memory on the PCI bus, the bridge can burst four 32-bit data words from the PCI memory into its buffer and then release the PCI bus to other PCI requestors while the EISA device reads the buffers. Therefore, the PCI bus is not held up by the EISA device. After the buffer is filled, the EISA device is notified to read the data from the buffer. The EISA device may then read the data from the buffer at its burst transfer speed. Thereafter, the EISA device makes another request and the process is repeated to receive another four data words. Thus, while the Intel bridge performs short bursts of data transfer at peaks bus speeds, it does not provide a consistent flow of data at peak bus speeds. Thus with the Intel chip set, the performance advantages of the PCI and EISA buses are not fully utilized.

Further, it is typical for a bus master on one bus to access data on another bus. In most cases, there are several bus masters requesting different data which can cause the bridge to become a bottleneck for data transmission. Thus, it is desirable to provide a high performance bridge circuit which accounts for the possibility of numerous data requests.

Buses can also operate at different frequencies. The bridge must therefore synchronize the signals to the clocks of the respective buses as the signals are translated from one bus to another. If a continuous flow of data is to be achieved, the synchronization must not be at the expense of performance.

Therefore, the bridge circuit of the present invention, as described below, is presented as overcoming the performance deficiencies of past bridge devices.

SUMMARY OF THE PRESENT INVENTION

The present invention disclosed and claimed herein comprises an apparatus and method for coupling a peripheral component interconnect (PCI) bus to an extended industry standard architecture (EISA) bus of a computer system. A PCI to PCI configuration is also disclosed. A bridge having a data buffer is provided for providing a write post buffer and data read ahead capabilities. The bridge is capable of being a master and a slave on both buses. The bridge further includes a slave interface and an arbiter for responding to bus masters.

The data buffer is comprised of a number of dual ported memories organized as first-in-first-out (FIFO) memories with each FIFO being allocated to a particular bus master. The arbiter selects among requesting bus masters and provides a grant signal. If the FIFO is not ready to continue the bridge forces the bus master to back-off, or retry the operation. Alternatively, the grant signal can be conditioned upon FIFO status or readiness.

The bridge further acts as a point of synchronization for the two buses. Each bus clock may operate at a frequency which is independant of the other and not a multiple of the other. The bridge includes a method and circuitry for synchronizing the status or flags of the FIFOs into the clock domain of the two buses so that the data operations can be performed very efficiently. The synchonized flags allow each bus to operate independant of the other, therefore, simultaneous reading and writing of the dual ported FIFOs is possible. Further, the simultaneous reading and writing can be performed to the same or different FIFOs.

Thus, the bridge provides a level of data streaming and parallelism not before available.

BRIEF DESCRIPTION OF THE DRAWINGS

A better understanding of the present invention can be obtained when the following detailed description of the preferred embodiment is considered in conjunction with the following drawings, in which:

FIG. 2A is a block diagram illustrating the disk drive array subsystem of the copu

FIGS. 5A, 5B and 5C are timing diagrams respectively illustrating an address initialization operation, a memory read operation, and a memory write operation according to the preferred embodiment

DETAILED DESCRIPTION OF THE PREFERRED EMBODIMENT

Figure 1:
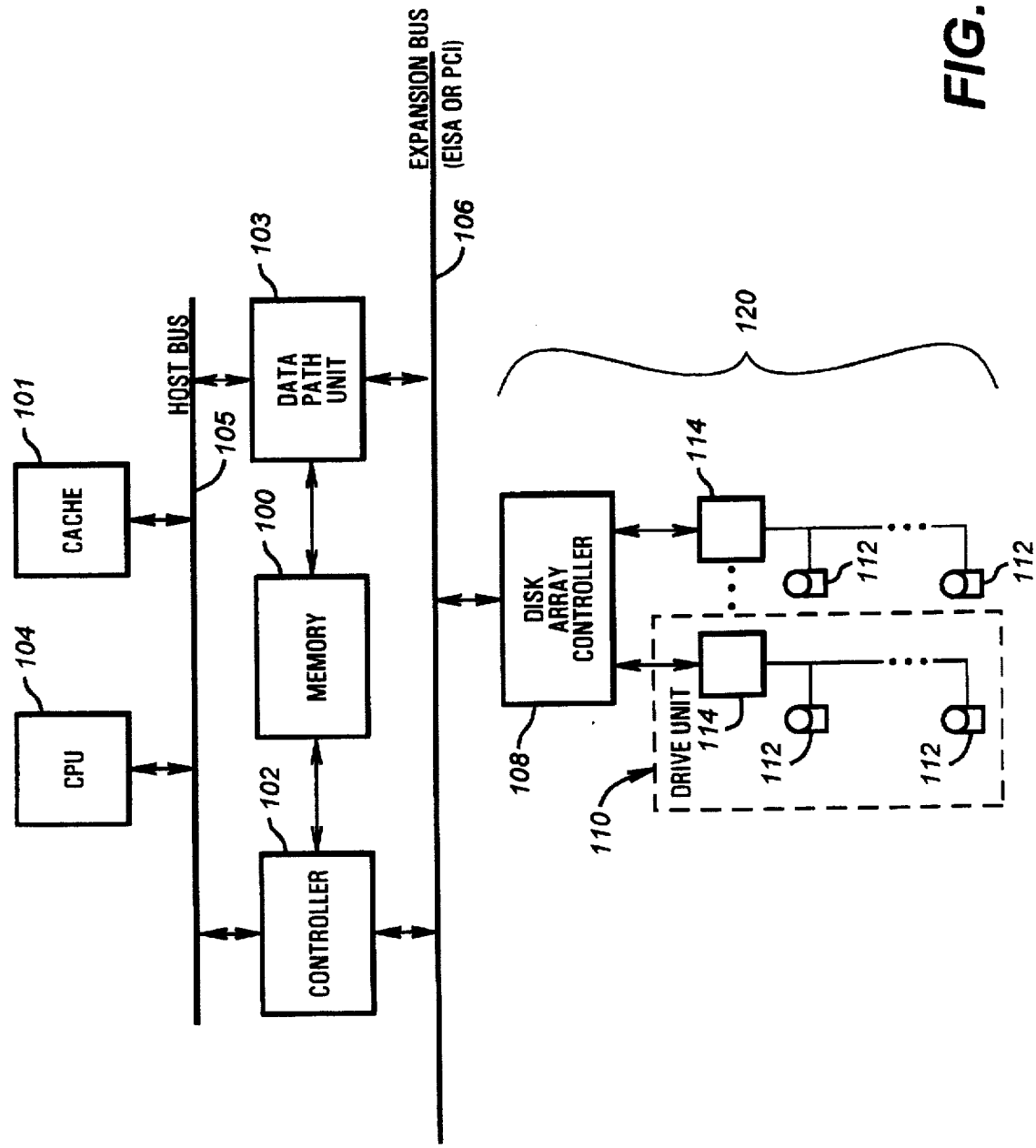
FIG. 1 is a block diagram illustrating a computer system according to the preferred embodiment.

Referring to FIG. 1, there is illustrated a computer system C utilizing the preferred embodiment of the present invention. A central processing unit (CPU) 104 is coupled to a host bus 105 for communicating with a high speed data cache 101 and system memory 100. A controller 102 and data path unit 103 are coupled to the memory 100 and between the host bus 105 and an expansion bus 106. Preferably the expansion bus 106 is either a peripheral component interconnect (PCI) or extended industry standard architecture (EISA) bus. Also shown in FIG. 1 is a disk drive array 120. Drive array 120 includes a disk array controller 108 which can function as a bus master, thereby transferring blocks of data to or from system memory 100. Disk array controller 108 has several drive units 110 interfaced to it. Each drive unit 110 has a SCSI bus controller 114. Each SCSI bus controller 114 may have up to seven physical drives 112 connected to it through a SCSI bus.

Drive array 120 is configured as a Redundant Array of Inexpensive Disks (RAID). Drive array 120, by transferring data to drive units 110 in parallel, allows for a much faster transfer rate than for a single drive having the same storage capacity. The physical drives 112 which comprise drive array 120 are transparent to system processor 104. Instead of generating physical commands for each drive 112, system processor 104 submits logical command lists to drive array 120. These logical command lists are for operations to be performed upon logical volumes which may use one or more drives 112. Disk array controller 108 converts the logical command list into a series of physical commands in order to distribute and retrieve data from drives 112. A more detailed description of the operation of drive array 120 can be found in U.S. patent application Ser. No. 08/543,011, entitled "Read Checking for Drive Rebuild," and U.S. patent application Ser. No. 08/542,800, entitled "User Selectable Priority for Disk Array Background Operations," both of which are filed concurrently herewith and are hereby incorporated by reference.

Figure 2:
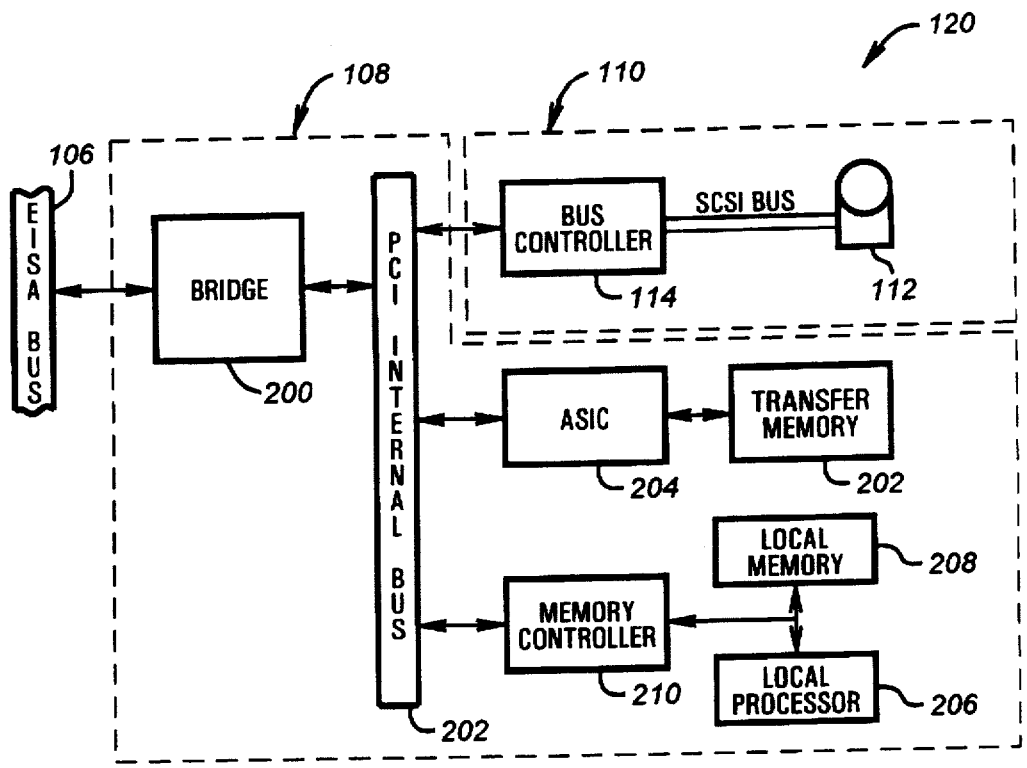
FIGS. 2 and 2A are a block diagrams illustrating the disk drive array subsystem of the computer system according to the preferred embodiment coupled to an extended industry standard architecture (EISA) bus and peripheral component interconnect (PCI) bus respectively.

Now referring to FIG. 2, is a more detailed block diagram of drive array 120. Disk array controller 108 has an internal Peripheral Component Interconnect (PCI) bus 202. Disk array controller 108 also has a local processor 206 which is interfaced to a local memory 208 which includes a random access memory (RAM) and a read only memory (ROM). Local processor 206 is interfaced to PCI bus 202 through a memory controller 210. Memory controller 210 can function both as a slave device and as a bus master and direct memory access (DMA) controller, programmed by system processor 104, to retrieve logical command lists from system memory 100. System processor 104 submits the logical command list to local processor 206 through memory controller 210. Also shown in FIG. 2 is an Application Specific Integrated Circuit (ASIC) 204. ASIC 204 is coupled to PCI bus 202. Also coupled to ASIC 204 is a transfer memory 202. Transfer memory 202 is utilized to post writes to the drive array 120, perform a hardware XOR for parity operations, to operate as a read cache and serve as a buffer for rebuild operations. ASIC 204 can function as a DMA controller which is programmed by local processor 206. ASIC 204 can transfer data from transfer memory 202 to system memory 100, and ASIC 204 can transfer data from system memory 100 to transfer memory 202. Also shown in FIG. 2 is a SCSI bus controller 114 of a drive unit 110. Each SCSI bus controller 114 can function as a bus master, thereby transferring data to or from drives 112 to system memory 100.

Figure 2A:
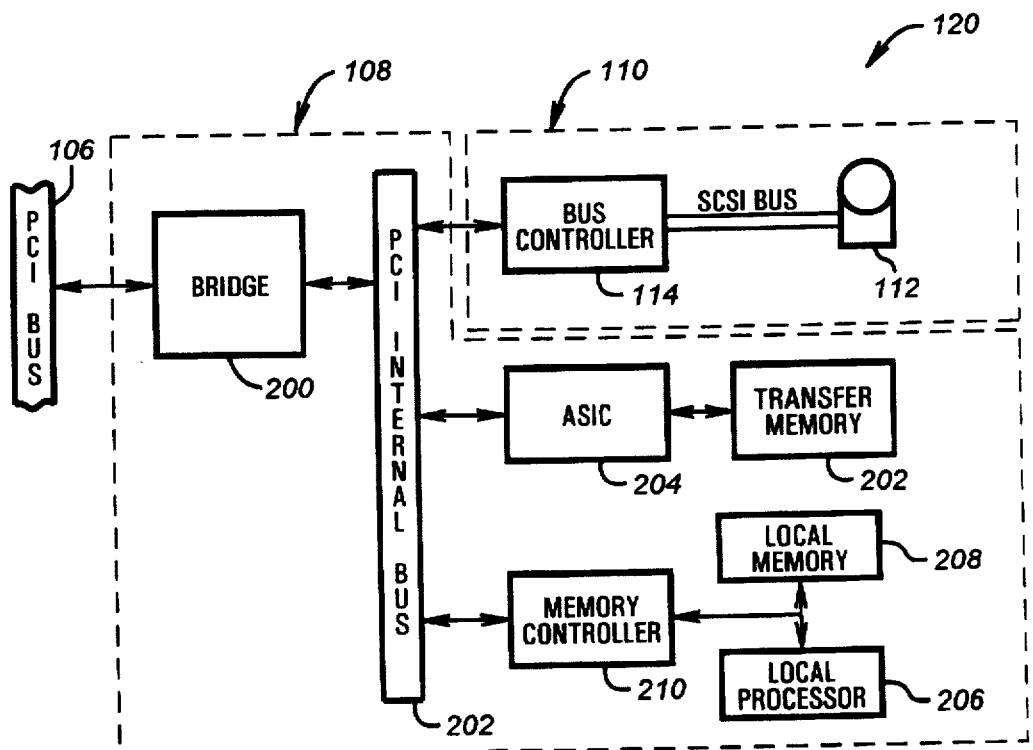

Of particular interest in FIG. 2 is a bridge circuit 200 coupled between EISA bus 106 and PCI bus 202. Bridge circuit 200 provides an interface between EISA bus 106 and PCI bus 202. Alternatively, as shown in FIG. 2A, the bridge circuit 200 may provide an interface between PCI bus 106 and PCI bus 202.

Figure 3:
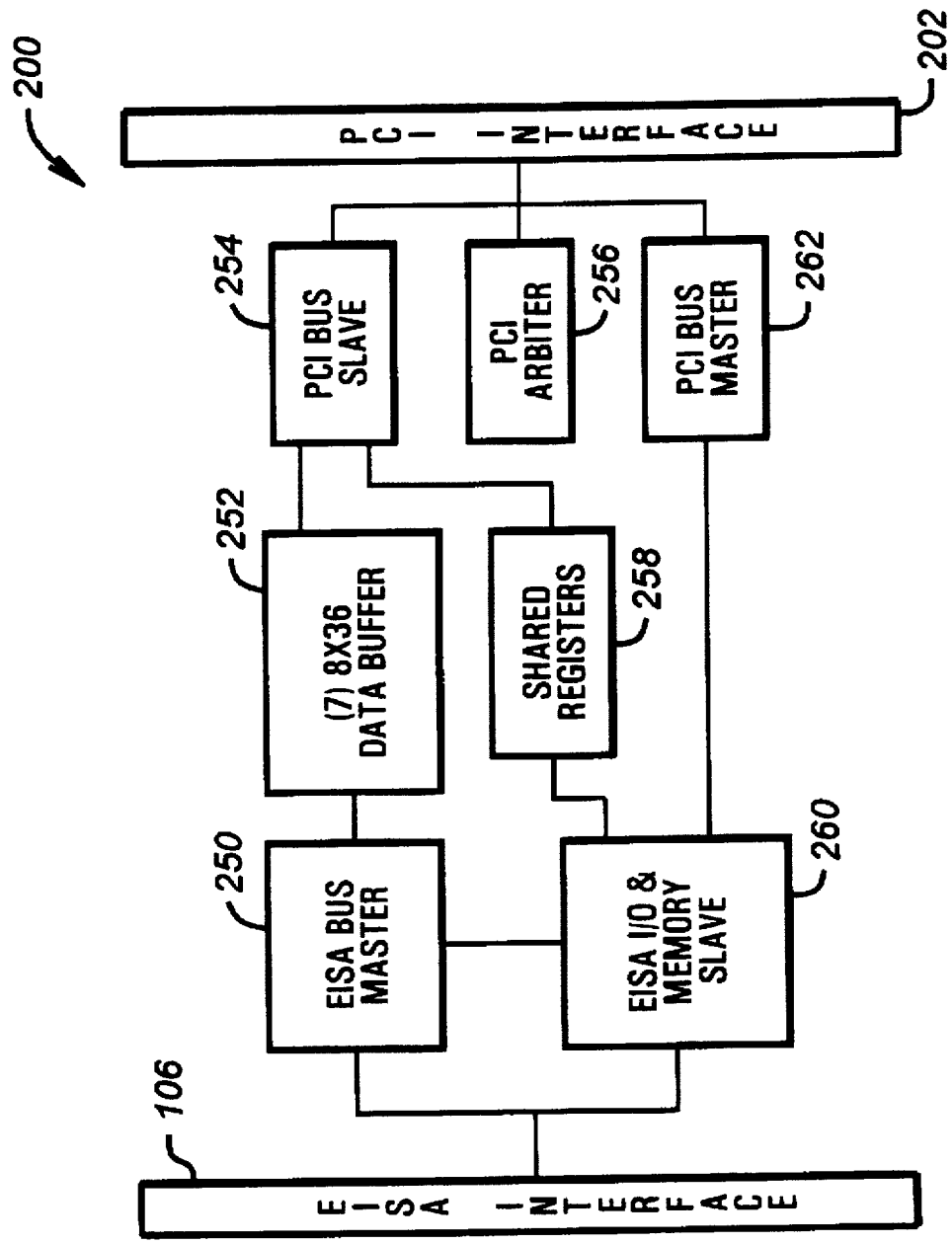
FIG. 3 is a functional block diagram illustrating the bridge circuit according to the preferred embodiment.

Now referring to FIG. 3, there is illustrated a more detailed block diagram of bridge circuit 200. EISA bus master 250 is coupled between EISA bus 106 and a data buffer 252. EISA bus master 250 generates the necessary EISA bus cycles to transfer or retrieve data from/to data buffer 252. The data buffer 252 provides a synchronization point for the transfer of data between PCI bus 202 and EISA bus 106.

Figure 7:
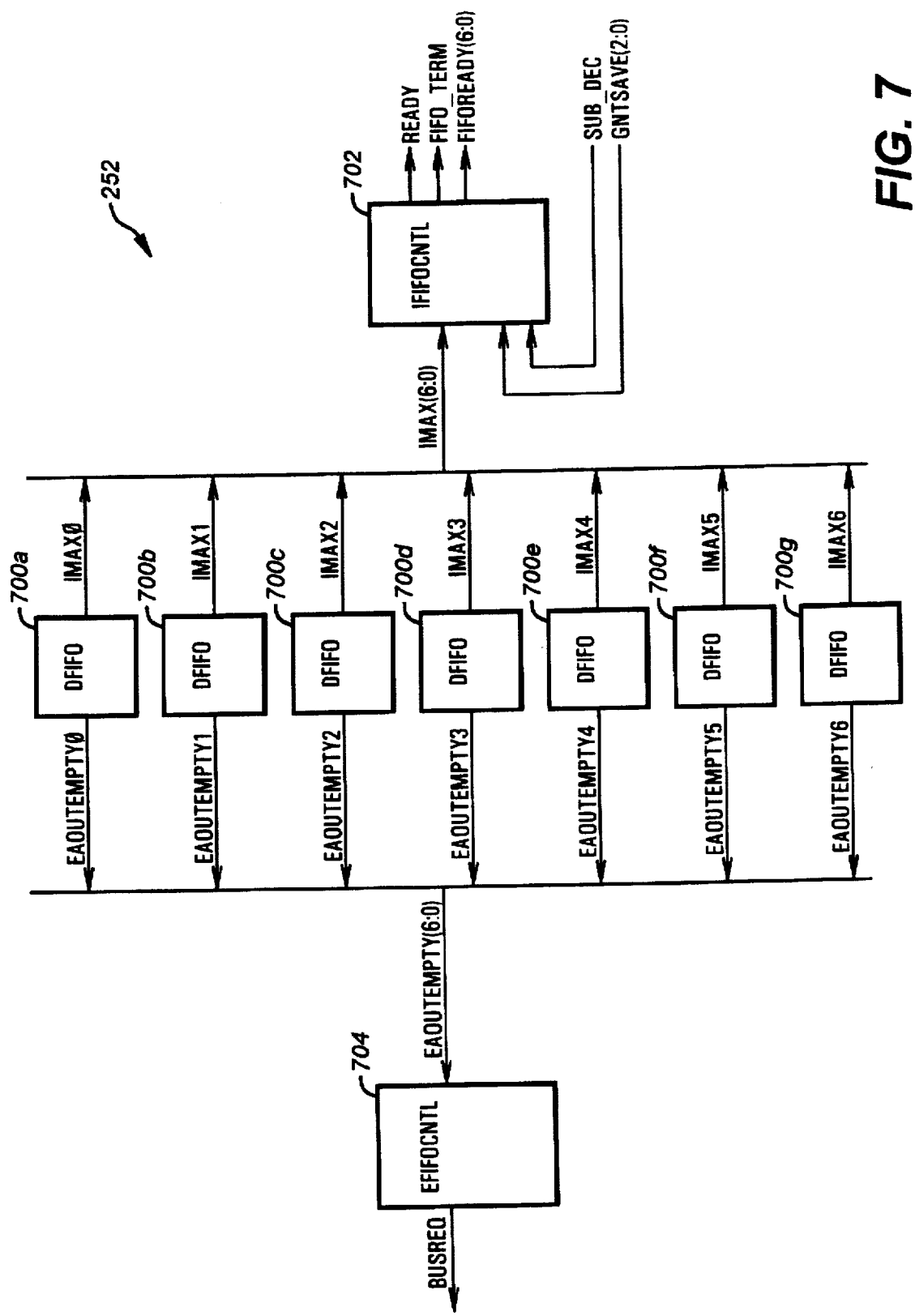
FIG. 7 is a functional block diagram illustrating the plurality of FIFOs with associated FIFO control logic according to the preferred embodiment.

Briefly turning to FIG. 7, the data buffer 252 is comprised of seven data first-in-first-out memories (FIFOs) 700(a–g). Preferably, each data FIFO 700 has eight storage locations and each location is 36 bits wide, which includes one Dword (double words, or 32-bits) of data and four bits of byte enable information. Furthermore, each data FIFO 700 is dual ported and bi-directional, whereby each port of the data FIFO 700 is capable of read and write operations. Additionally, the ports are frequency independent, whereby one port can be clocked at one frequency and the other side can be clocked at a different frequency. Each data FIFO 700 is assigned to a set of bus master grant-request lines on PCI bus 202. Data from one data FIFO 700 can be written from one side and read from the other side simultaneously.

Also shown in FIG. 3 is a PCI bus slave 254 which is coupled between the data buffer 252 and PCI bus 202. In order for a PCI bus master to write or read from system memory 100, the PCI bus master must read from or write to bus slave 254 which functions as a slave port for data buffer 252. Disk controller 114, ASIC 204 and memory controller 210 can all become the PCI bus master. Bus slave 254 decodes the PCI bus cycles, and EISA bus master 250 generates the appropriate EISA bus cycles to complete the transfer of data. Thus, whenever the PCI bus master writes to system memory 100, data will flow through PCI bus slave 254, one data FIFO 700 of the data buffer 252 assigned to the corresponding bus grant-request pair, and EISA bus master 250. When the FIFO is ready, an interrupt can be passed from the PCI bus agent corresponding to that FIFO to the EISA bus. If data is being written to memory from one of the FIFOs 700, the interrupt is held off until data clears the FIFOs.

Also shown in FIG. 3 is an EISA I/O and memory slave 260. Memory slave 260 is interfaced to EISA bus 106. Memory slave 260 is written to or read from by an EISA bus master whenever the EISA bus master is accessing drive array 120. Memory slave 260 decodes the EISA bus cycles. Memory slave 260 is also coupled to a PCI bus master 262. PCI bus master 262 is also interfaced to PCI bus 202. PCI bus master 262 generates the appropriate PCI bus cycles to receive or transfer data from or to PCI bus 202. Note that for transfers by the EISA bus master, there is no data FIFO between memory slave 260 and bus master 262.

PCI bus slave 254 and memory slave 260 are both interfaced to shared registers 258. Bridge circuit 200 also includes a PCI arbiter 256 which is interfaced to PCI bus 202. PCI arbiter assigns the highest priority to bus master 262, next priority goes to local processor 206, and the priority for remaining PCI bus masters is on a first come, first serve basis. Data buffer 252 provides a read ahead capability for read operations from system memory 100 by the PCI bus master.

Figure 4:
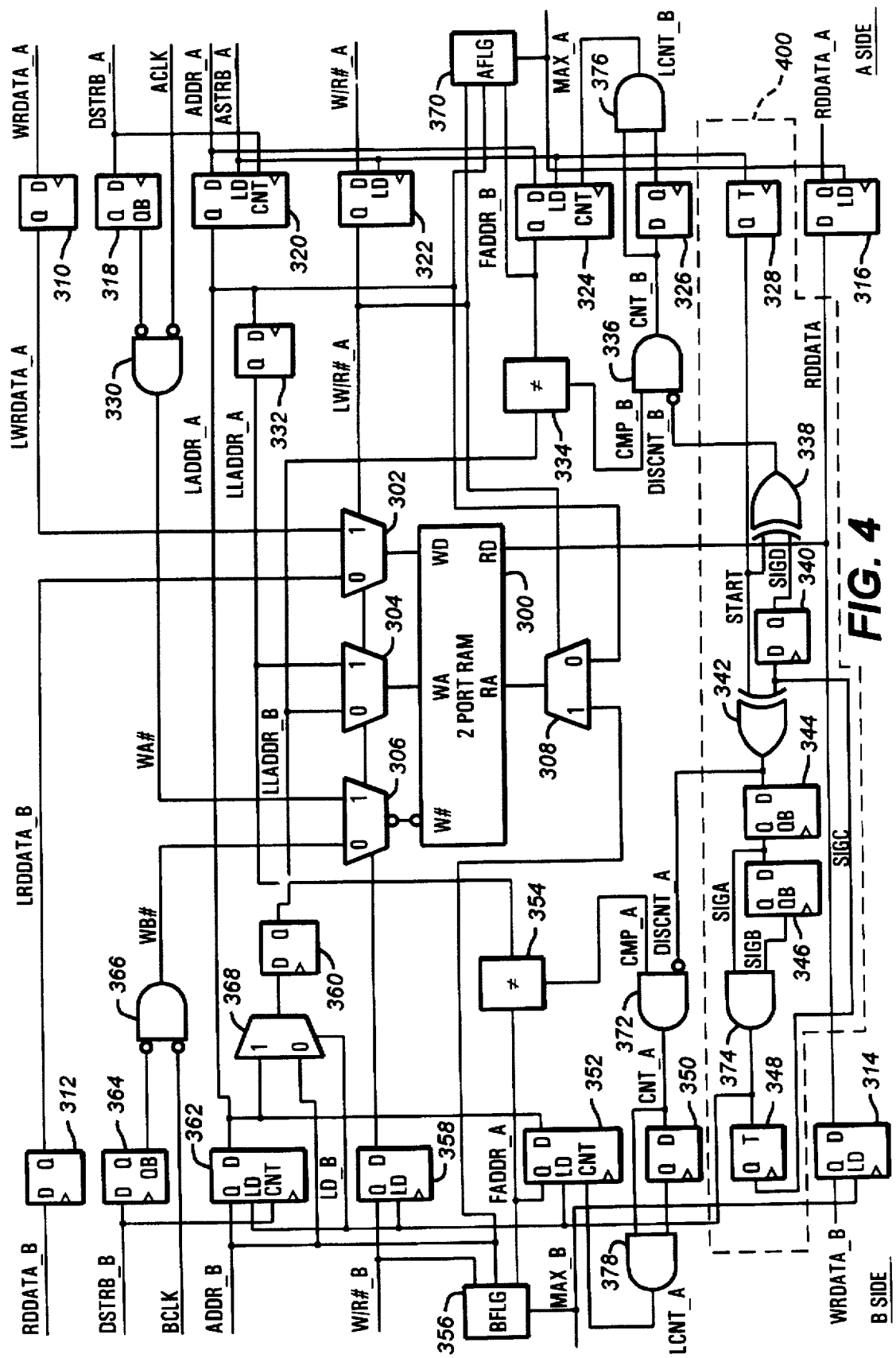
FIG. 4 is a detailed block diagram illustrating the data FIFO of the bridge circuit according to the preferred embodiment.

Now referring to FIG. 4, a single FIFO 700 of the data buffer 252 is shown. Each of the data FIFOs 700 has an A side and a B side. In the preferred embodiment, the A side is coupled to the PCI bus slave 254 and the B side is coupled to the EISA bus master 250. Alternatively, the EISA bus master logic 250, and the EISA I/O and memory slave logic 260 can be replaced with PCI master and slave logic to provide a bridge for coupling two PCI buses together using the present invention as shown in FIG. 2A. Conversely, the PCI master and slave logic can be replaced with EISA master and slave logic for coupling two EISA buses together using the present invention. The PCI side components are synchronous to a PCI clock (ACLK) and the EISA side components are synchronous to an EISA clock (BCLK).

Bridge 200 essentially has two data paths. The EISA I/O and memory slave 260 and the PCI bus master 262 comprise a first data path for communicating command and control information between the system processor 104 and the disc array 110. A second data path is comprised of a PCI bus slave 254, the data buffer 252, and the EISA bus master 250. The second data path is primarily used for passing blocks of data between the system memory 100 and disc array 110. Data communications over the data transfer path are initiated by a PCI bus master such as a bus controller 114. Thus, with regard to FIG. 4, read and write operations from system memory 100 are initiated on the PCI side, also referred to as the A side.

Each of the seven data FIFOs 700 contain the logic shown in FIG. 4. A dual ported static random access memory (RAM) 300 has a write data input (WD), a write address input (WA), and a write indication input (W#) for writing data into the dual ported RAM 300. The other port has a read data output (RD) and read address input (RA) for reading data from the dual ported RAM 300.

Since data may be read or written from either the PCI side or the EISA side, a plurality of multiplexors 302, 304, 306, and 308 are provided to select from the address and data signals. Selection is based on a registered version of a PCI write/read signal (LW/R#_A) which is synchronous to ACLK. The registered PCI write/read signal is provided to each of the multiplexors 302, 304, 306 and 308 by a flip-flop 322. A flip-flop 358 also receives the registered PCI write/read signal for providing an EISA write/read signal (W/R#_B),synchronous to BCLK, for use by the EISA bus master 250.

Data to be written to the dual ported RAM 300 is provided by the write data multiplexor 302. A 1 input of the multiplexor 302 is connected to a PCI write data flip-flop 310 for receiving data (WRDATA_A) to be written to system memory 100. A 0 input of the multiplexor 302 is connected to a EISA read data flip-flop 312 for receiving data (RDDATA_B) read from system memory 100. The WRDATA_A and RDDATA_B buses are 36 bits wide as they contain 32 data bits and four byte enable bits.

Data read from the dual ported RAM 300 is provided to both the PCI and EISA sides. The read data output of the dual ported RAM 300 provides a read data bus (RDDATA) which is connected to an EISA write data flip-flop 314 and a PCI read data flip-flop 316. The EISA write data flip-flop 314 provides a write data bus (WRDATA_B) to the EISA bus master 250 for writing data to system memory 100. The PCI read data flip-flop 316 provides a read data bus (RDDATA_A) to the PCI bus slave 254 for receiving data read from system memory 100. The PCI side flip-flops are synchronous to the PCI clock and the EISA flip-flops are synchronous to the EISA clock. Further, it is noted that the data flip-flops 314 and 316 have a load input for indicating when the data is available on the RDDATA bus and should be registered. This feature will be discussed further below with regard to the flags.

Data is written into the dual ported RAM 300 by a signal provided from the write strobe multiplexor 306. A 1 input of the write strobe multiplexor 306 receives a write strobe (WA#) from an AND gate 330. One inverted input of the AND gate 330 receives the ACLK clock and a second inverted input is connected to an inverted output of a data strobe flip-flop 318. A data strobe (DSTRB_A) is provided by the PCI bus slave 254 and received into a D input of the data strobe flip-flop 318. Each data FIFO 700 has its own data strobe signal. Thus, when the data strobe signal is provided and ACLK is not provided, a write strobe is provided to the multiplexor 306. A 0 input of the write strobe multiplexor 306 receives a write strobe (WB#) from an AND gate 366. One inverted input of the AND gate 366 receives the BCLK clock and a second inverted input is connected to an inverted output of a data strobe flip-flop 364. A data strobe (DSTRB_B) is provided by the EISA bus master 250 and received into a D input of the data strobe flip-flop 364. Each data FIFO receives its own data strobe from the EISA bus master 250. Thus, when the data strobe signal is provided and BCLK is not provided, a write strobe is provided to the multiplexor 306.

The write address input of the dual ported RAM 300 receives an output from the write address multiplexor 304.

The address received by the dual ported RAM 300 is comprised of address bits 4–2 of the respective address bus for addressing up to eight storage locations. A 1 input of the multiplexor 304 receives a registered address bus (LLADDR_A) from a Q output of a flip-flop 332. The LLADDR_A bus is also provided to an input of a comparator 354. A D input of the flip-flop 332 receives a registered addressed bus (LADDR_A) from a Q output of an address counter 320. The LADDR_A bus is also provided to an input of a flag generator 370, a zero input of a multiplexor 308, a D input of an address counter 362, a D input of an address follower counter 352 and a 1 input of a multiplexor 368. A D input of the address counter 320 and a D input of an address follower 324 receives an address bus (ADDR_A) from the PCI bus slave logic 254.

A 0 input of the multiplexor 304 receives a registered address bus (LLADDR_B) from a Q output of a flip-flop 360. The LLADDR_B bus is also provided to an input of a comparator 334. A D input of the flip-flop 360 is connected to an output of the multiplexor 368. A 0 input of the multiplexor 368 is connected to an EISA address bus (ADDR_B) bus. A Q output of the address counter 362 provides the EISA address bus (ADDR_B) to the EISA bus master 250, the 0 input of the multiplexor 368, an input of a flag generator 356 and a 1 input of the multiplexor 308.

Addresses are provided from the PCI bus slave 254 and loaded into the data FIFOs 700 by an address strobe (ASTRB_A) signal. Each data FIFO 700 has its own address strobe signal. The address strobe signal is received into a load input of the address counter 320, a load input of the flip-flop 322, a load input of the address follower 324 and a T input of a toggle flip-flop 328. The PCI address is loaded into the PCI side by the address strobe (ASTRB_A) signal and loaded into the EISA side by a load B (LD_B) signal provided by initialization logic 400.

An output of the toggle flip-flop 328 provides a start (START) signal and is connected to one input of an XOR gate 342 and one input of an XOR gate 338. The output of the XOR gate 342 provides a disable count (DISCNT_A) signal to a D input of a flip-flop 344 and an inverted input of an AND gate 372. An output of the XOR gate 338 provides a disable count (DISCNT_B) signal to an inverted input of an AND gate 336. A second input of the XOR gate 338 receives a SIGD signal from a Q output of a flip-flop 340. A second input of the XOR gate 342 and a D input of the flip-flop 340 receive a SIGC signal from a Q output of a toggle flip-flop 348. The T input of the toggle input 348 is connected to an output of a AND gate 374. One input of the AND gate 374 and a D input of a flip-flop 346 receive a SIGA signal from a Q output of the flip-flop 344. An inverted (QB) output of the flip-flop 346 is provided to a second input of the AND gate 374. The output of the AND gate 374 provides the load signal (LD_B) for loading the address on the EISA side from the PCI side. The LD_B signal is provided to a load input of the address follower counter 352, a load enable input of a flip-flop 358, a load input of the address counter 362 and the select input of the multiplexor 368.

The disable count signals (DISCNT_A and DISCNT_B) are provided during a period of time when the addresses are loaded into the address flip-flops and counters. Afterwards, the disable count signals are not asserted so that the second input to the AND gates controls the output.

Flag circuitry is incorporated on both the PCI and EISA sides. The flag generation logic 370 generates a flag signal (MAX_A) based upon the registered PCI address bus (LADDR_A), a EISA address follower bus (FADDR_B) and the LW/R#A signal. The address follower counter 324 provides the FADDR_B bus to the flag generator 370 and an input of a not equal comparator 334. The comparator 334 compares the FADDR_B bus to the LLADDR_B bus to provide an output comparison (CMP_B) signal to a second input of the AND gate 336 when the buses are not equal. The output of the AND gate 336 is provided to an input of an AND gate 376 and a D input of a flip-flop 326. A Q output of the flip-flop 326 is provided to a second input of the AND gate 376. The output of the AND gate 376 provides a count (LCNT_B) signal to a count input of the EISA address follower counter 324.

Similarly, on the EISA side a flag generator 356 generates a flag signal (MAX_B) based on the W/R#_B signal, the EISA address bus (ADDR_B) and a PCI address follower bus (FADDR_A). The PCI address follower counter 352 provides the FADDR_A bus to the flag generator 356 and an input of a not equal comparator 354. The comparator 354 compares the FADDR_A bus to the LLADDR_A bus to provide an output comparison (CMP_A) signal to a second input of the AND gate 372 when the buses are not equal. The output of the AND gate 372 is provided to an input of an AND gate 378 and a D input of a flip-flop 350. A Q output of the flip-flop 350 is provided to a second input of the AND gate 378. The output of the AND gate 378 provides a count enable signal (LCNT_B) to a count input of the PCI address follower counter 352.

The flag signals indicate data availability or FIFO full, and provide an enable signal for the data flip-flops 314 and 316 when data is being read from the dual ported RAM 300.

Figure 5A:
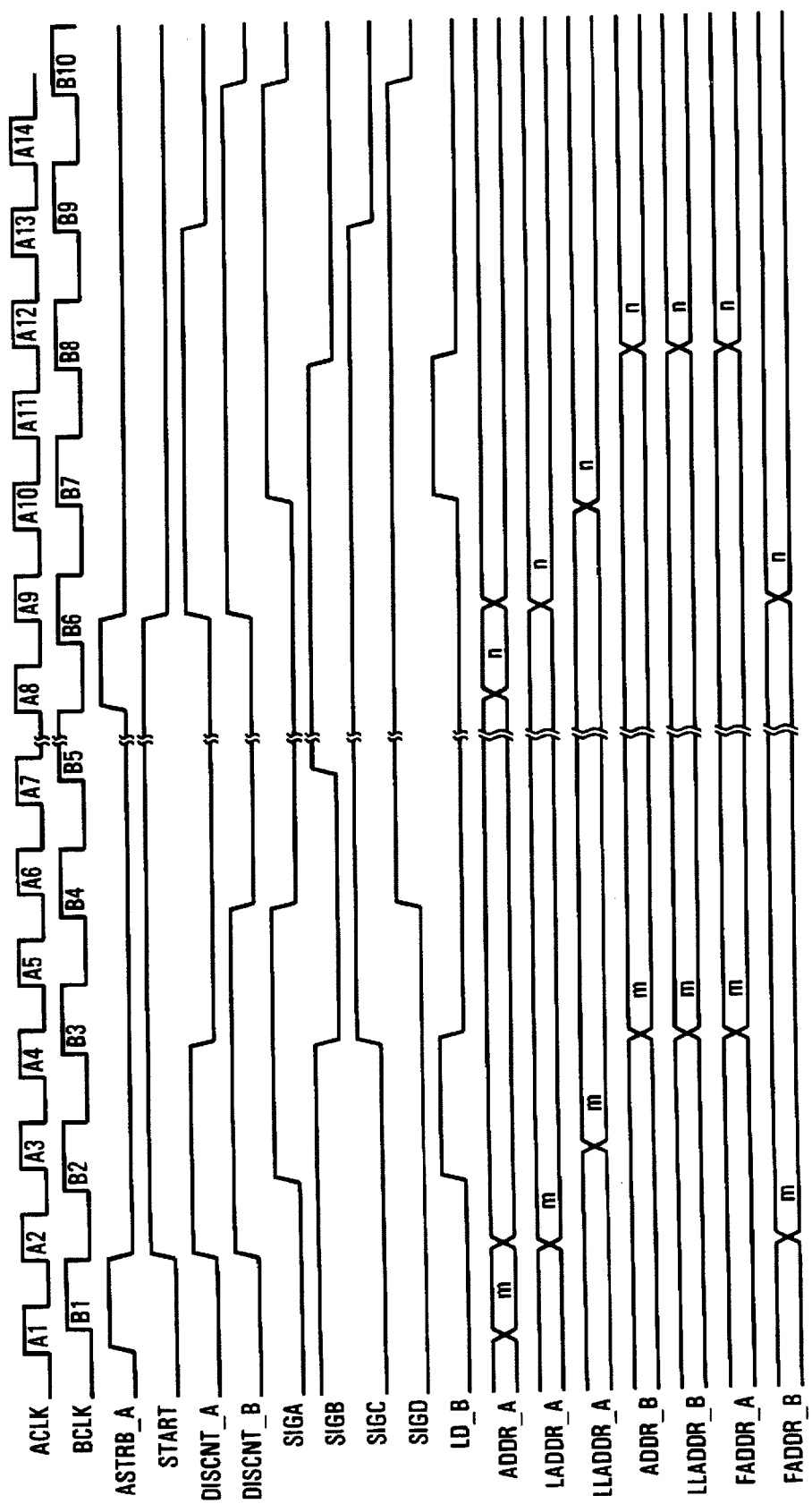

With reference to FIGS. 5A, 5B and 5C, the operation of the data FIFO 700 is more fully explained. It is noted that the signals interacting with the PCI bus slave logic 254 are synchronous to the PCI bus clock (ACLK), while the signals interacting with the EISA bus master 250 are synchronous to the EISA bus clock (BCLK). Although BCLK is shown as a multiple of ACLK, the circuitry does not require any frequency relationship. Additionally, the clocks may be stopped and started without affecting the synchronization circuitry.

Referring now to FIG. 5A, the operation of the initialization logic 400 is further explained. At an ACLK edge A1, the address strobe and address are provided from the PCI bus slave 254 for either a read or write operation. At ACLK edge A2, the address is loaded into address counter 320 and the EISA address follower counter 324. At ACLK edge A3, the address is loaded into a delay flip-flop 332. The address is not loaded into the EISA side until the load signal (LD_B) is provided.

At ACLK edge A2 the address strobe signal causes the start signal to toggle which in turn causes signals SIGA, SIGB, SIGC and SIGD to operate resulting in the production of the load signal (LD_B). The load signal is synchronous to BCLK and at a clock edge B3 causes the address to be loaded into the address counter 362, the flip-flop 358 and the PCI address follower counter 352.

Subsequent to the above described operation, at a clock edge A8 of ACLK the address strobe and address are again provided causing the PCI address to be registered into the address counter 320 and the EISA address follower counter 324 at a clock edge A9. At clock A10 the address is registered into flip-flop 332. Also at clock A9, the toggle flip-flop 328 causes the start signal to toggle which sets off a sequence of events producing the load signal at clock edge B7 of BCLK. At a clock edge B8, when the load signal is asserted the address is loaded into the address counter 362, the flip-flop 360 and the PCI address follower counter 352. Thus, the initialization logic 400 provides a synchronous load signal for the EISA side.

Now referring to FIG. 5B, the operation of the data FIFOs 700 will be explained in the context of a memory read operation. For exemplary purposes, FIG. 5B illustrates the timing for a data FIFO 700 having a two Dword deep FIFO. The timing diagram for deeper FIFOs can be readily constructed from this example. It is noted that for this example the address buses have already been initialized, as described above in FIG. 5A, with a value n.

The EISA bus master 250 is responding to the read request. At a BCLK edge B1, the DSTRB_B signal is asserted to indicate that data is available to be written into the dual ported RAM 300. Although not shown, data is available on the LRDDATA_B bus at this time so that at a BCLK edge B2 the data is written. DSTRB_B also causes the EISA bus address counter 362 to be incremented at B2. At BCLK edge B3 the incremented address is clocked into flip-flop 360 which causes the incremented address to be presented to the not-equal comparator 334. At this point, the LLADDR_B bus is pointing to the next highest Dword address from that of the FADDR_B bus, so the CMP_B signal is asserted, as shown at B3.

The CMP_B signal is used to increment the EISA bus address follower counter 324 in the ACLK clock domain. It is noted that the CMP_B signal is synchronous to BCLK and the counter 324 is clocked by ACLK. A well known phenomenon can occur if the setup time for a flip-flop is not met. If the setup time is violated, then no guarantee can be made about what the output will do. The output may be normal or the output may be unstable for some time before it settles into a known state. This phenomenon, called metastability is handled by the flip-flop 326. The flip-flop 326 attempts to synchronize the CMP_B signal to the ACLK clock domain so that a clean LCNT_B signal is presented to the EISA bus address follower counter 324.

As the DISCNT_B signal is negated after the address initialization of FIG. 5A, the output of AND gate 336 is solely dependant upon CMP_B. At ACLK edge A4 the CMP_B signal is clocked into flip-flop 326. Preferably the LCNT_B signal is stable by clock A5, at which time the count signal causes the EISA bus address follower counter 324 to increment. Thus, the address of the EISA bus master is synchronized into the PCI side clock domain.

After FADDR_B is incremented at ACLK edge A5, the CMP_B signal is negated as the addresses are no longer dissimilar. However, the dissimilar addresses received into the A flag generation logic 370 causes the MAX_A signal to be provided.

The MAX_A signal is interpreted differently depending on the state of LW/R#_A. If a memory read is being performed, MAX_A indicates data availability and is provided when LADDR_A is less than FADDR_B. If a memory write is being performed, MAX_A indicates FIFO full and is provided when LADDR_A is greater than or equal to FADDR_B+x (where x is the depth of the FIFOs). Expressed in equation format:

MAX_A=(LW/R#_A*(LADDR_A≥(FADDR_B+x)))+(!LW/R#_A*(LADDR_A<FADDR_B)

In the preferred embodiment x=8, but in the example of FIG. 5B, x=2.

At BCLK edge B4 the second data word was written into the dual ported RAM 300 causing the ADDR_B bus to increment. The incremented address further causes the B flag generation logic 356 to provide the MAX_B signal. The MAX_B signal is also interpreted differently depending on the state of W/R#_B. If a memory read is being performed, MAX_B indicates FIFO full and is provided when ADDR_B is greater than or equal to FADDR_A+x (where x is the depth of the FIFOs). Expressed in equation format:

MAX_B=(! LW/R#_B*(ADDR_B≥(FADDR_A+x)))+(LW/R#_B*(ADDR_B<FADDR_A)

In the preferred embodiment x=8, but in the example of FIG. 5B, x=2. If a memory write is being performed, MAX_B indicates data availability and is provided when ADDR_B is less than FADDR_A. Thus, the MAX_A and MAX_B flags are provided synchronously to their respective sides.

Although not specifically shown, data is read from the dual ported RAM 300 by the PCI slave logic 254 causing the PCI side address to be incremented, as shown by LADDR_A at ACLK edge A7. This in turn causes the MAX_A flag to be deasserted, as LADDR_A is equal to FADDR_B.

Meanwhile, the effects of the second data write operation have caused the FADDR_B bus to be incremented again, as shown at ACLK edge A8, thereby causing the MAX_A flag to be asserted. The MAX_A flag indicates that data may be read from the dual ported RAM 300. Data is read from the dual ported RAM 300 by the PCI slave logic 254 causing the PCI side address to be incremented, as shown by LADDR_A at ACLK edge A9. According to the flag logic 370, MAX_A is deasserted after LADDR_A is incremented.

Referring back to ACLK edge A8, after LLADDR_A has been incremented, the EISA side not-equal comparator 354 provides the CMP_A signal as LLADDR_A and FADDR_A are not equal. Flip-flop 350 attempts to synchronize the CMP_A signal to the BCLK clock domain, similarly to flip-flop 326 on the PCI side. As shown in FIG. 5B, BCLK edge B6 clocks the CMP_A signal into the flip-flop 350 and BCLK edge B7 causes the PCI address follower counter to increment. The EISA side now has a synchronous version of the first incremented PCI address which causes the B flag generation logic 356 to deassert the MAX_B signal.

Between BCLK edge B7 and ACLK edge A10, the addresses received into the EISA side not-equal comparator 354 cause the CMP_A signal to be deasserted. However, at ACLK edge A10 the LLADDR_A bus is updated and the CMP_A signal is asserted again, thereby causing the PCI address follower counter 352 to be incremented, as shown at BCLK edge B9.

Thus, as can be appreciated, with each side receiving synchronous flags the PCI and EISA sides can operate simultaneously to produce a continuous data flow through the dual ported RAM 300 for very efficient data transfers through the bridge 200.

Now referring to FIG. 5C, the operation of the data FIFOs 700 will be explained in the context of a memory write operation. For exemplary purposes, FIG. 5C illustrates the timing for a data FIFO 700 having a two Dword deep FIFO. The timing diagram for deeper FIFOs can be readily constructed from this example. It is noted that for this example the address buses have already been initialized, as described above in FIG. 5A, with a value n.

In this example, the bus controller 114 is writing data to system memory 100. With respect to the bridge 200, the PCI bus slave 254 is writing received data into a data FIFO 700, while the EISA bus master reads the data from the data FIFO 700 and writes it to system memory 100.

At a ACLK edge A1, data is provided on the WRDATA_A bus (not shown) and DSTRB_A is asserted. At ACLK edge A2, data is clocked into the data flip-flop 310 and LADDR_A is incremented. At ACLK edge A3 data is written into the dual ported RAM 300 at the address indicated by LLADDR_A. Clock edge A3 causes the incremented address to be clocked into the address flip-flop 332 causing the LLADDR_A bus to change and the comparison (CMP_A) signal to be asserted. At clock B3, CMP_A is clocked into the flip-flop 350 to eliminate most metastability problems and to provide a clean count signal to the PCI address follower counter 352. At clock B4, the counter 352 is incremented to provide the EISA side with a synchronous version of the PCI side address. The CMP_A signal continues to be asserted until clock edge B5, when the address on the FADDR_A bus catches up to the address value on the LLADDR_A bus.

The difference between the FADDR_A bus and the ADDR_B bus cause the flag generation logic 356 to provide the MAX_B flag. The MAX_B signal indicates data availability, as described above.

Referring back to ACLK edge A3, it is noted that a second data strobe (DSTRB_A) is provided, causing the PCI side address (LADDR_A) to be incremented to address n+1 at clock A4. After the LADDR_A bus is incremented, the PCI side flag generation logic 370 compares LADDR_A to FADDR_B and provides the flag (MAX_A) to indicate that the FIFO is full.

At BCLK edge B5, the EISA side data strobe (DSTRB_B) is provided as data is read from the dual ported RAM 300. Clock edge B6 causes ADDR_B to be incremented. Clock edge B7 passes the incremented address onto the LLADDR_B bus and causes the comparison signal (CMP_B) to be asserted. The CMP_B signal is clocked into flip-flop 326 a clock A10 to eliminate most metastability problems and to provide a clean count signal (LCNT_B) to the EISA address follower counter 324. At clock A11, the counter 324 is incremented to provide the PCI side with a synchronous version of the EISA side address. The CMP_B signal is deasserted after FADDR_B is incremented, as it reflects the same address value as is on the LLADDR_B bus.

After FADDR_B is incremented at clock A11, the PCI side flag generation logic 370 deasserts the MAX_A flag as an indication that the dual ported RAM is no longer completely full. The PCI bus slave logic uses this flag to write more data into the data FIFO 700.

Meanwhile, after the second EISA data strobe (DSTRB_B) and ADDR_B is incremented at BCLK edge B8, the MAX_B flag is deasserted to indicate to the EISA bus master logic 250 that there is no longer any data available in the data FIFO 700.

One can easily appreciate, that if the timing diagram reflected a FIFO of greater depth, simultaneous writing and reading to/from the data FIFO 700 would be achieved.

Figure 6:
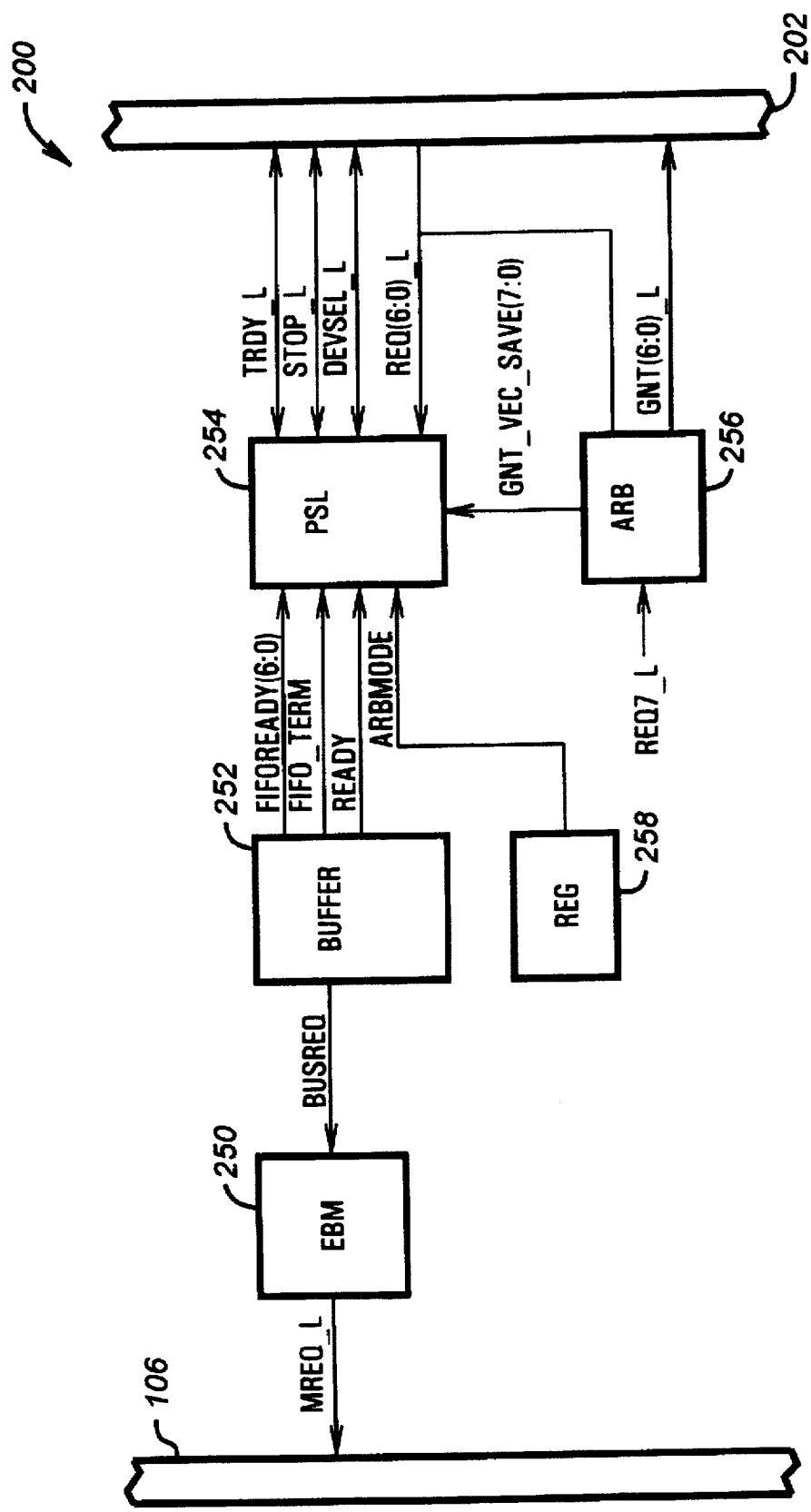
FIG. 6 is a functional block diagram illustrating the bus access signals of the bridge circuit according to the preferred embodiment.

Referring now to FIG. 6, there is illustrated a functional block diagram of the bridge circuit 200. As described above, the data buffer 252 is coupled to the PCI bus 202 by a PCI slave logic block 254, and to the EISA bus 106 by an EISA bus master block 250. In the preferred embodiment read and write data transfers originate from PCI bus masters residing on the PCI bus 202. The PCI slave logic 254 receives the PCI bus signals for communicating with the PCI bus masters during data transfers. The PCI slave logic 254 decodes the incoming address to determine whether the bridge 200, or some device upstream, is being addressed. Those familiar with PCI bus designs will appreciate the signals necessary for handling PCI transactions.

Additionally, the PCI slave logic 254 and the arbitration logic 256 receive seven bus request signals from the PCI bus masters. The PCI slave logic 254 monitors several PCI signals including, a target ready (TRDY_L) signal, a stop (STOP_L) signal, and device select (DEVSEL_L) signal. When responding to a PCI bus master, these signals may be driven to complete or terminate the transaction. The PCI slave logic also receives a number of signals from the buffer 252, including seven FIFO ready (FIFOREADY(6:0)) signals, a FIFO termination (FIFO_TERM) signal, and a ready (READY) signal. Each FIFOREADY signal provides an indication to the PCI slave logic 254 of whether its respective FIFO 700 is ready to receive data in the case of a memory write operation, or is ready to provide data to the bus master in the case of a read operation. The FIFO_TERM signal provides an indication to the PCI slave logic 254 of whether the data transfer should be terminated because either the FIFO has been flushed or a 1k page boundary has been reached and the address counters need to be reinitialized. The READY signal corresponds to the particular FIFO that is being accessed and indicates to the PCI slave logic 254 whether that FIFO is ready to receive data in the case of a memory write, or to provide data in the case of a memory read. An arbitration mode (ARBMODE) signal is provided from the register logic 258 for indicating how the bridge 200 backs off from requesting PCI bus masters. One state is preferable for when the bridge is expecting peer to peer transfers with other bridges.

The arbiter 256 receives seven bus access request signals (REQ(6:0)_L) corresponding to seven PCI bus masters. Each bus request signal corresponds to a FIFO 700, thus each bus master is allocated an individual FIFO, or data channel, and may request its FIFO by asserting its bus request signal. The arbiter 256 also receives an internal bus access request (REQ7_L) for when the bridge 200, through the PCI bus master 262, needs access to the PCI bus 202. The arbiter 256 prioritizes the requests based on a predetermined scheme. The internal bus access request always has highest priority so a bus deadlock condition will not arise. The REQ6_L request, which is provided by the memory controller 210 has the next highest priority when REQ7_L is not present. Requests for channels 5–0 have straight line priority with channel 5 being the highest and channel 0 the lowest. If more than one channel is being requested, priority sequences through to the lower priority channels before returning to the higher priority channel. In other words, if channels 5–0 are requesting indefinitely, the grant sequence is: 5, 4, 3, 2, 1, 0, 5, 4, 3, 2, 1, 0. If channel 6 is also requesting, priority alternates between one of the lower priority group and channel 6. In other words, 6, 5, 6, 4, 6, 3, 6, 2, 6, 1, 6, 0, 6, 5 . . . . The grant vector save (GNT_VEC_SAVE(7:0)) is a set of signals for granting the PCI bus to one of the requesting bus masters.

In the operation of the bridge 200, bus access requests are processed by the arbiter 256 and a bus access grant is provided. After the bus master controls the bus and a data operation is initiated, the PCI slave logic responds to the bus master according to the signals received from the FIFO 700. The first response is to assert a device select (DEVSEL_L) signal for indicating that the bridge 200 is the addressed target of the data operation. If the FIFO is not ready to receive or provide data, the bus transaction is terminated by the PCI slave logic with a stop (STOP_L) signal and/or a target ready (TRDY_L) signal. Those familiar with the PCI bus will recognize that there are three types of target initiated termination. The bridge 200 signals retry by asserting STOP_L and not asserting TRDY_L. The bridge 200 can disconnect with also transferring data by asserting TRDY_L and STOP_L together. The bridge 200 can disconnect without transferring data on subsequent data phases by not asserting TRDY_L and asserting STOP_L. A fatal type of abort can be signaled by deasserting DEVSEL_L and asserting STOP_L. Otherwise if the FIFO 700 is ready, the data operation proceeds as normal.

The data buffer 252 provides a bus request (BUSREQ) signal to the EISA bus master logic 250. If any of the FIFOs 700 are ready to provide data to the EISA bus 106, in the case of a write operation, or to receive data from the EISA bus, in the case of a read operation, the bus request signal is provided, which is passed onto the EISA bus in the form of a bus master request (MREQ_L) signal.

Referring now to FIG. 7, there is illustrated a more detailed functional block diagram of the data buffer 252. As noted above, the data buffer 252 contains seven data FIFOs 700 corresponding to the seven PCI bus masters. Each data FIFO 700 is capable of write posting data from the PCI bus masters and read ahead operations from memory coupled to the EISA bus. Each data FIFO provides an pair of signals for indicating its state of readiness. An IMAX signal is provided to the PCI side FIFO control logic 702 for indicating the FIFO is read full or write empty. An EAOUTEMPTY signal is provided to the EISA side FIFO control logic 704 for indicating whether the FIFO is read full or write empty. These signals are synchronized to the clocks of the respective buses. The EISA side FIFO control logic 704 logically ORs the signals together to provide the bus request signal (BUSREQ) to the EISA bus master logic 250. The PCI side FIFO control logic 702 receives the IMAX signals, a subtractive decode (SUBDEC) signal, and a PCI grant indication signal (GNTSAVE(2:0) for providing the READY, FIFO_TERM, and FIFOREADY(6:0) signals.

Figure 8:
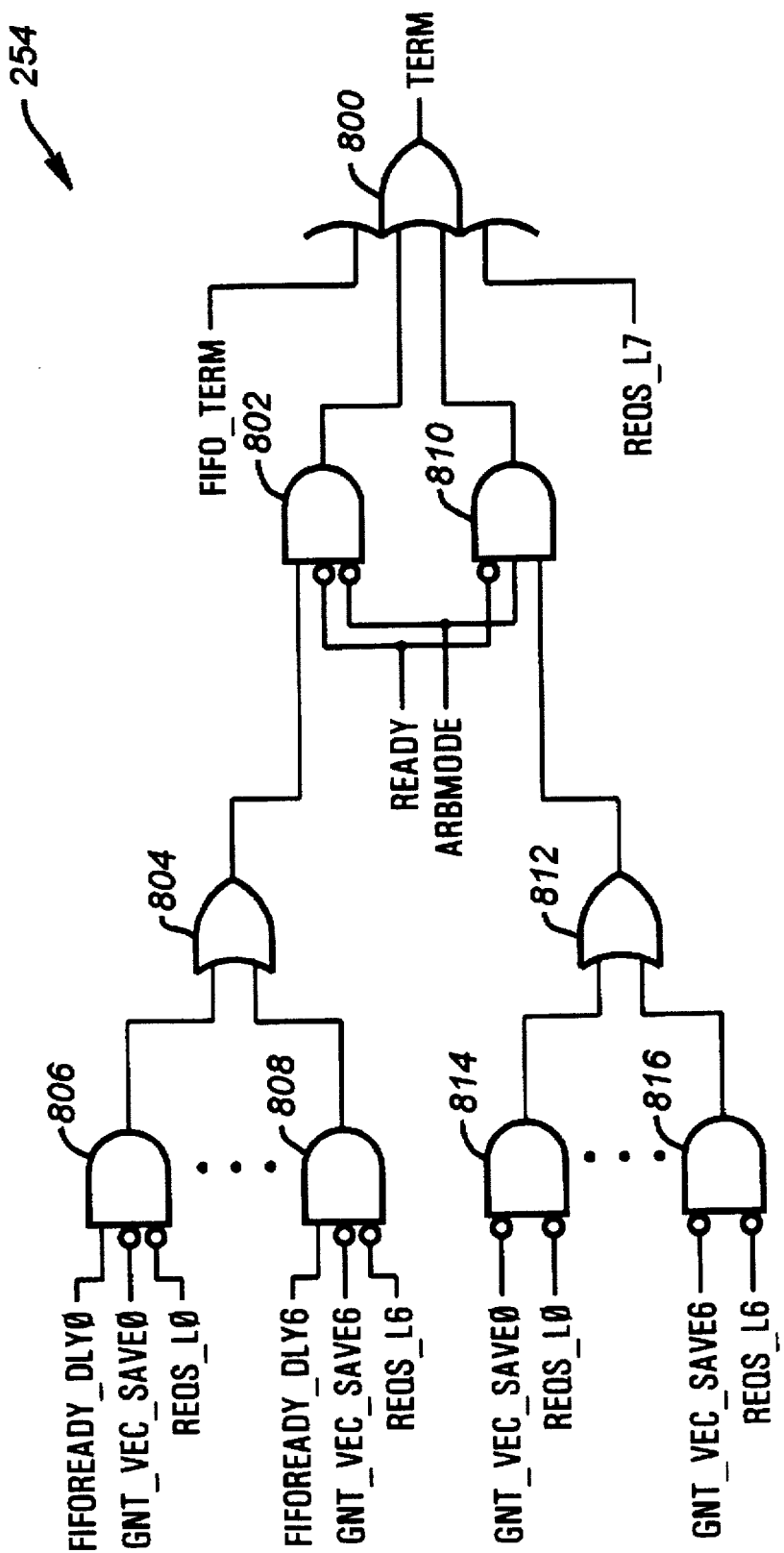
FIG. 8 is a schematic diagram illustrating the formation of the PCI bus termination signal according to the preferred embodiment.

Referring now to FIG. 8, there is illustrated a schematic diagram of the formation of a termination signal. The termination (TERM) signal is internal to the PCI slave logic 254 for indicating that the PCI operation should be terminated. A four input OR gate 800 provides the TERM signal. One input of the OR gate 800 receives the FIFO termination signal (FIFO_TERM) from the FIFO control logic 702 when either the FIFO should be flushed or a 1K page boundary is reached. A second input to the OR gate 800 is connected to the internal PCI bus request for when the bridge 200 needs access to the PCI bus 202. Two other inputs to the OR gate 800 are provided from circuitry which is dependent upon the state of the arbitration mode (ARBMODE) signal. An inverted input of an AND gate 802 and a noninverted input of a AND gate 810 receive the ARBMODE signal. The ARBMODE signal is asserted high if peer-to-peer operations are expected.

Inverted inputs of the AND gates 802 and 810 receive the ready signal (READY). A noninverted input of the AND gate 802 receives the output of an OR gate 804. Inputs to the OR gate 804 are provided from seven AND gates, 806 though 808. Each of the AND gates 806 through 808 receive corresponding FIFOREADY_DLY, GNT_VEC_SAVE, and REQS_L signals. Thus, if the FIFO corresponding to the bus master which has been granted the bus is not ready then the operation will be terminated if another FIFO is ready, the grant to that other FIFO is not provided but the other FIFO is requesting.

A third input to the AND gate 810 is connected to the output of an OR gate 812. The OR gate 812 has seven inputs for receiving the outputs of AND gates 814 through 816. Each of the AND gates 814 through 816 have inverted inputs for receiving corresponding GNT_SAVE and REQS_L signals. AND gate 812 only effects the termination signal if the ARBMODE signal is high. Thus in this mode, if the FIFO corresponding to the granted bus master is not ready, then the operation will be terminated if another FIFO is requesting the bus, but is not granted the bus.

Figure 9:
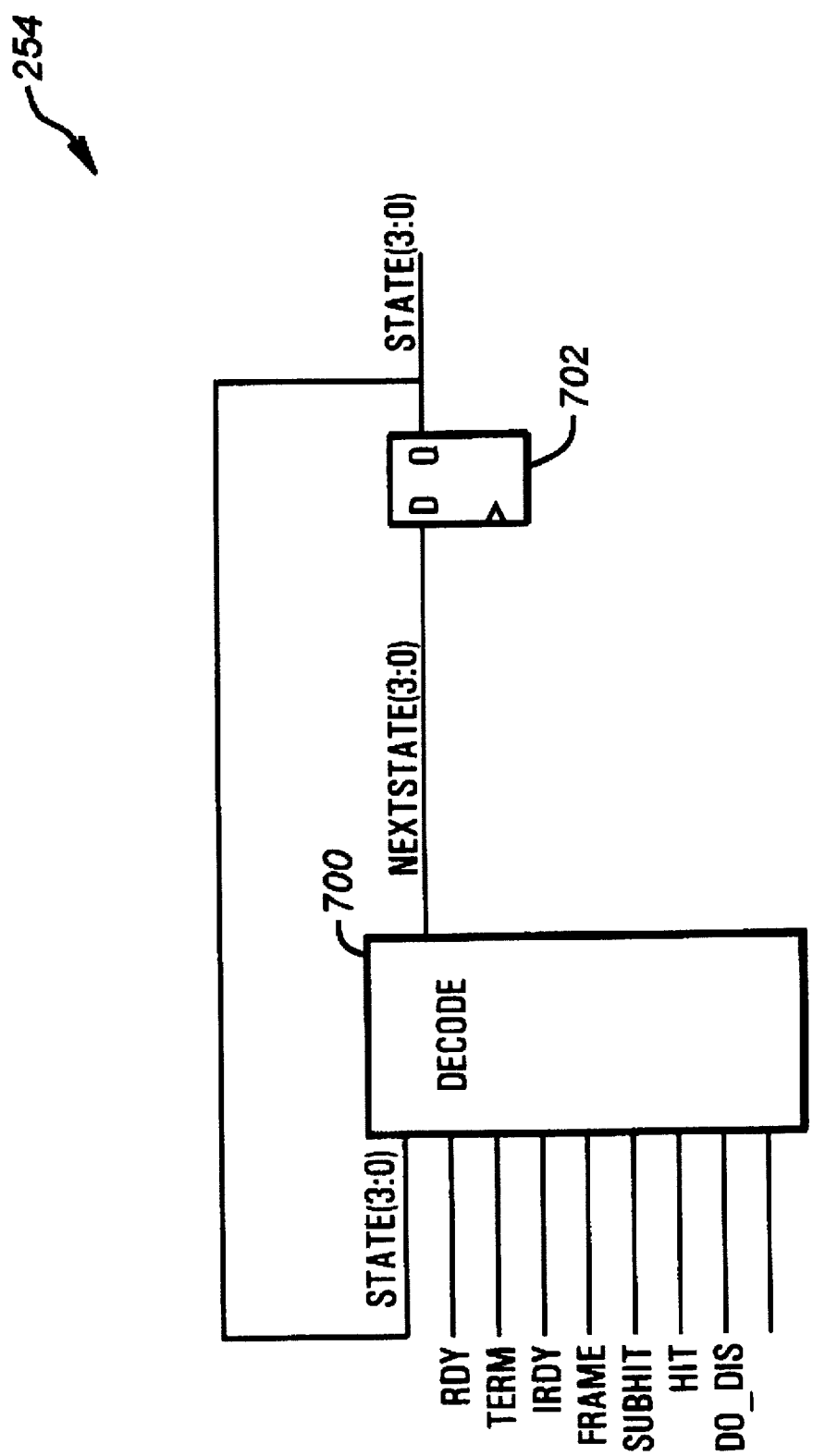
FIG. 9 is a functional block diagram illustrating the PCI bus slave state machine according to the preferred embodiment.

Referring now to FIG. 9 there is illustrated a state machine of the PCI slave logic 254. Among several signals received by a decode block 900 is the termination (TERM) signal. The decode block 900 provides a next state indication (NEXTSTATE (3:0)) to a D flip flop 902 which provides the state machine output (STATE (3:0)).

Figure 10:
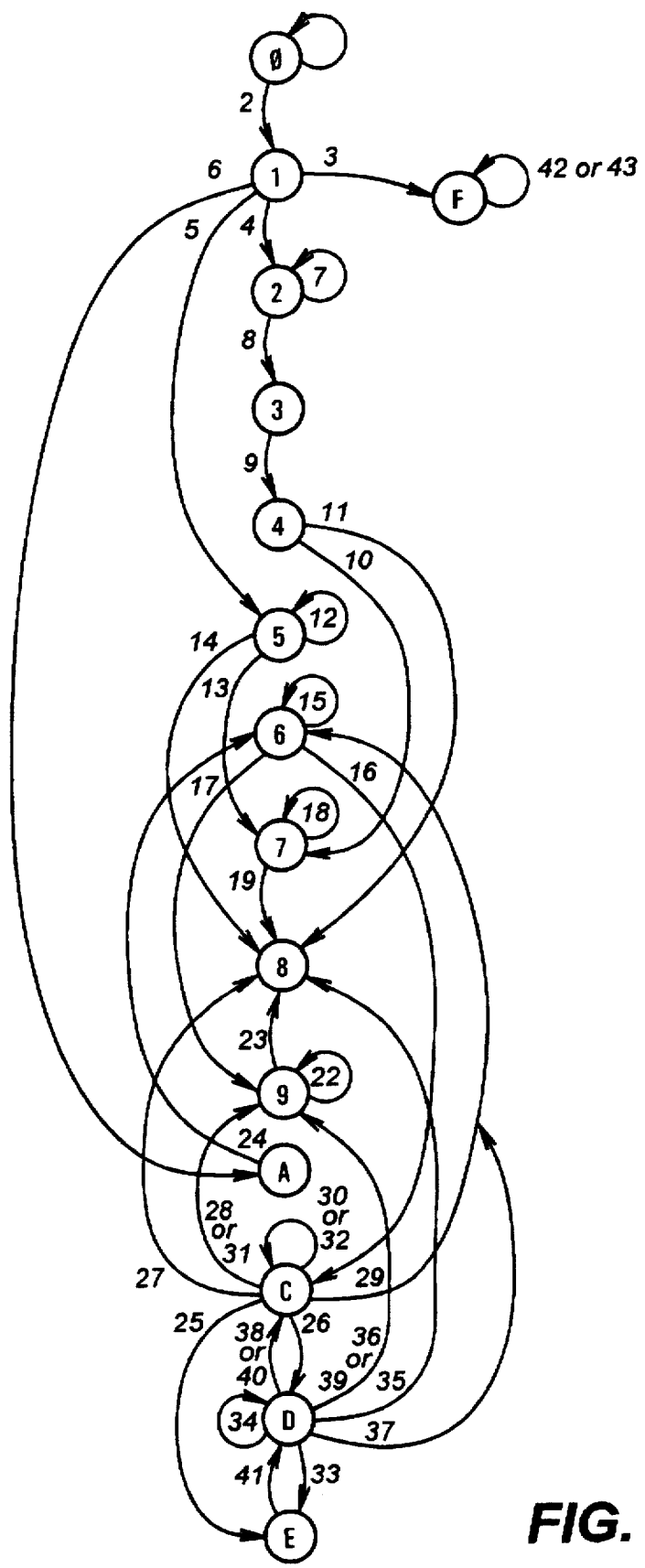
FIG. 10 is a state diagram illustrating the state transitions of the state machine of FIG. 8 according to the preferred embodiment.

Referring now to FIG. 10, there is illustrated a state machine diagram for the state transitions of state machine illustrated in FIG. 9. The members correspond to the decoded conditions illustrated in Table 1.

TABLE 1

| | NEXTSTATE Generation Conditions | | | | | | | | |
|---|---|---|---|---|---|---|---|---|---|
| | DO DIS | HIT | SUB HIT | IWR | FRAME | IRDY | TERM | RDY | STATE | NEXT STATE |
| 1 | X | X | X | X | 0 | X | X | X | 0 | 0 |
| 2 | X | X | X | X | 1 | X | X | X | 0 | 1 |
| 3 | X | 0 | 0 | X | X | X | X | X | 1 | f |
| 4 | X | 1 | X | 0 | X | X | X | X | 1 | 2 |
| 5 | X | 1 | X | 1 | X | X | X | X | 1 | 5 |
| 6 | X | X | 1 | X | X | X | X | X | 1 | a |
| 7 | X | X | X | X | X | 0 | X | X | 2 | 2 |
| 8 | X | X | X | X | X | 1 | X | X | 2 | 3 |
| 9 | X | X | X | X | X | X | X | X | 3 | 4 |
| 10 | X | X | X | X | 1 | X | X | X | 4 | 7 |
| 11 | X | X | X | X | 0 | X | X | X | 4 | 8 |
| 12 | X | X | X | X | X | 0 | X | X | 5 | 5 |
| 13 | X | X | X | X | 1 | 1 | X | X | 5 | 7 |
| 14 | X | X | X | X | 0 | 1 | X | X | 5 | 8 |
| 15 | X | X | X | X | X | X | 0 | 0 | 6 | 6 |
| 16 | X | X | X | X | X | X | X | 1 | 6 | c |
| 17 | X | X | X | X | X | X | 1 | 0 | 6 | 9 |
| 18 | X | X | X | X | 1 | X | X | X | 7 | 7 |
| 19 | X | X | X | X | 0 | X | X | X | 7 | 8 |

TABLE 1-continued

NEXTSTATE Generation Conditions

|    | DO DIS | HIT | SUB HIT | IWR | FRAME | IRDY | TERM | RDY | STATE | NEXT STATE |
|----|--------|-----|---------|-----|-------|------|------|-----|-------|------------|
| 20 | X | X | X | X | 0 | X | X | X | 8 | 0 |
| 21 | X | X | X | X | 1 | X | X | X | 8 | 1 |
| 22 | X | X | X | X | 1 | X | X | X | 9 | 9 |
| 23 | X | X | X | X | 0 | X | X | X | 9 | 8 |
| 24 | X | X | X | X | X | X | X | X | a | 6 |
| 25 | X | X | X | 0 | X | 0 | X | X | c | e |
| 26 | X | X | X | 1 | X | 0 | X | X | c | d |
| 27 | X | X | X | X | 0 | 1 | X | X | c | 8 |
| 28 | 1 | X | X | X | 1 | 1 | X | X | c | 9 |
| 29 | 0 | X | X | X | 1 | 1 | 0 | 0 | c | 6 |
| 30 | 0 | X | X | X | 1 | 1 | 0 | 1 | c | c |
| 31 | 0 | X | X | X | 1 | 1 | 1 | 0 | c | 9 |
| 32 | 0 | X | X | X | 1 | 1 | 1 | 1 | c | c |
| 33 | X | X | X | 0 | X | 0 | X | X | d | e |
| 34 | X | X | X | 1 | X | 0 | X | X | d | d |
| 35 | X | X | X | X | 0 | 1 | X | X | d | 8 |
| 36 | 1 | X | X | X | 1 | 1 | X | X | d | 9 |
| 37 | 0 | X | X | X | 1 | 1 | 0 | 0 | d | 6 |
| 38 | 0 | X | X | X | 1 | 1 | 0 | 1 | d | c |
| 39 | 0 | X | X | X | 1 | 1 | 1 | 0 | d | 9 |
| 40 | 0 | X | X | X | 1 | 1 | 1 | 1 | d | c |
| 41 | X | X | X | X | X | X | X | X | e | d |
| 42 | X | X | X | X | 1 | X | X | X | f | f |
| 43 | X | X | X | X | X | 1 | X | X | f | f |

Figure 11:
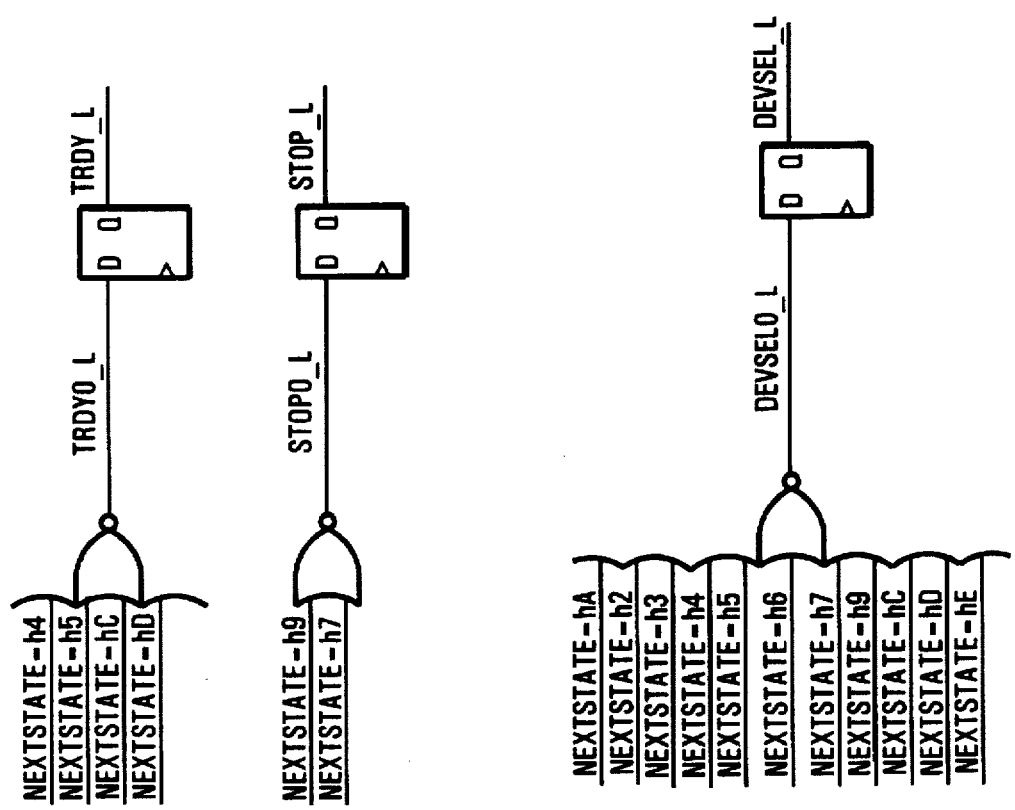
FIG. 11 is a schematic diagram illustrating the formation of the PCI bus termination signals according to the preferred embodiment.

Now referring to FIG. 11, there is illustrated logic pertaining to the generation of the TRDY_L, STOP_L, and the DEVSEL_L signals. As shown, the target ready signal is asserted on the next clock edge after NEXTSTATE equals 4, 5, C, or D. The STOP signal is asserted on the next clock edge after NEXTSTATE equals 7 or 9. The device select signal is asserted when NEXTSTATE equals 2 through 7, 9, A, or C through E.

Thus, in the bridge circuit 200 the PCI arbiter will grant the bus to a requesting PCI bus master regardless of the condition of the FIFO channel. If after the PCI bus master has been granted the bus, the bridge 200 determines that the FIFO channel is being accessed and is not ready, then the transaction or operation is terminated. This allows for PCI operations to take place on the PCI bus between two devices residing on the PCI bus, even though the data FIFO for that requesting bus master is not ready. These peer to peer transactions may occur between bus controller 114, ASIC 204 and memory controller 210. Thus, the arbiter residing in the bridge 200 is not ignorant to bus activity which does not involve the bridge. Alternatively, if peer to peer activity is not expected and all PCI traffic involves the bridge 200, the bus grant signals can be conditioned on the availability of the FIFO data channel.

Therefore, the present invention provides a data buffer for each bus master, with the data buffer having write posting and read ahead capabilities for improved bridge performance. The synchronization of FIFO readiness signals also improves the responsiveness of the bridge to activity on the opposing buses.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A circuit for generating a data buffer content indication of a dual ported data buffer device, the dual ported data buffer receiving a first address and a second address, said first address being synchronous to a first clock, said second address being synchronous to a second clock, the circuit comprising:

a counter having a data input receiving said second address, a load input for receiving a load indication, a count enable input receiving a count indication, a clock input receiving said first clock, and a count output for providing a synchronous second address;

a comparator having a first input receiving the second address, a second input receiving said synchronous second address and an output for providing a not equal indication;

a flip-flop having a data input receiving said not equal indication, a clock input receiving said first clock, and a data output;

a AND gate having one input connected to said flip-flop data output, a second input receiving said not equal indication and an output for providing said count indication;

a flag generation means having a first input receiving said first address, a second input receiving said synchronous second address and an output for providing a data buffer content indication based on the difference between said addresses; and wherein said data buffer content indication is synchronous to said first clock.

2. The circuit of claim 1, wherein said data buffer content indication further includes providing a full indication when data is being written to the data buffer from the first bus, if said first bus address is greater than or equal to a sum of said synchronous second bus address added to said number of data locations.

3. The circuit of claim 1, wherein said data buffer content indication further includes providing an empty indication when said first bus is reading data from the data buffer, if said first bus address is less than said synchronous second bus address.

4. The circuit of claim 1, wherein the bridge further comprises:
   means for passing said first bus address to said second bus address, data and control providing means; and
   means for providing a load indication to said second bus address, data and control providing means when said first bus address is first provided and valid.

5. A bridge for coupling a primary bus to a secondary bus, the primary bus capable of being clocked asynchronously to the secondary bus, the bridge having a dual ported buffer for simultaneous read/write burst operations, the dual ported buffer having a primary interface and a secondary interface, the bridge further comprising:
   a primary bus counter coupled to the primary interface and responsive to a primary bus clock for providing an address to a first port of the dual ported buffer, said primary bus counter operable to load a first bus cycle address, said primary bus counter operable to increment the first bus cycle address according to a primary bus data cycle;
   a secondary bus counter coupled to the secondary interface and responsive to a secondary bus clock for providing an address to a second port of the dual ported buffer, said secondary bus counter operable to load the first bus cycle address, said secondary bus counter operable to increment the first bus cycle address according to a secondary bus data cycle;
   a secondary bus follower counter coupled to the primary interface and responsive to the primary bus clock for providing an address indicative of the address of said secondary bus counter, said secondary bus follower counter operable to load the first bus cycle address, said secondary bus follower counter responsive to a count indication to increment the first bus cycle address;
   a comparator operable to generate a difference indication based on the addresses of the primary and secondary bus counters, one of the addresses being a read address and the other of the addresses being a write address;
   a gating device responsive to the primary bus clock and operable to receive the difference indication and provide a count indication to the secondary bus follower counter if there is a difference in the addresses compared; and
   a status generator operable to generate a fullness indication of the dual ported buffer based on a difference between the addresses of said primary bus counter and said secondary bus follower counter, the fullness indication being provided synchronous to said primary bus.

6. The bridge of claim 5, wherein if the first bus cycle is a burst read cycle, the address provided by said primary bus counter is a read address and the address provided by said secondary bus counter is a write address.

7. The bridge of claim 5, wherein if the first bus cycle is a burst write cycle, the primary bus data cycle and the secondary bus data cycle include a plurality of data cycles.

8. The bridge of claim 5, wherein if the first bus cycle is a read cycle the fullness indication indicates data availability in the dual ported buffer.

9. The bridge of claim 5, further including:
   a buffer depth register coupled to said status generator operable to store a programmable threshold value, and
   wherein if the first bus cycle is a write cycle the fullness indication indicates whether the dual ported buffer has reached the programmable threshold.

10. A method of synchronously bridging a primary bus to a secondary bus, the primary bus clocked according to a primary bus clock, the secondary bus clocked according to a secondary bus clock, the primary bus clock capable of being asynchronous to the secondary bus clock, the bridge having a dual ported buffer for simultaneous read/write burst operations, the dual ported buffer having a primary interface and a secondary interface, the method comprising the steps of:
   loading a primary bus counter with a first bus cycle address according to the primary bus clock;
   loading a secondary bus counter with the first bus cycle address according to the secondary bus clock;
   loading a secondary bus follower counter with the first bus cycle address according to the primary bus clock;
   incrementing the primary bus counter, according to the primary bus clock, for each first bus data cycle after said first bus cycle;
   incrementing the secondary bus counter, according to the secondary bus clock, for each secondary bus data cycle after said first bus cycle;
   comparing the addresses of the primary and secondary bus counters;
   incrementing the secondary bus follower counter, according to the primary bus clock, if there is a difference between the addresses of the primary and secondary bus counters; and
   generating a fullness indication, synchronous to the primary bus clock, of the dual ported buffer based on a difference between the addresses of the primary bus counter and the secondary bus follower counter.

11. The method of claim 10, wherein if the first bus cycle is a burst read cycle, the address provided by said primary bus counter is a read address and the address provided by said secondary bus counter is a write address.

12. The method of claim 10, wherein if the first bus cycle is a burst write cycle, the primary bus data cycle and the secondary bus data cycle include a plurality of data cycles.

13. The method of claim 12, further comprising the step of:
   repeating the incrementing, comparing and generating steps for each data cycle if the bus cycle is a burst operation.

14. The method of claim 10, wherein if the first bus cycle is a read cycle the fullness indication indicates data availability in the dual ported buffer.

15. The method of claim 10, wherein the bridge further includes a buffer depth register for storing a programmable threshold value, the method further comprising the step of:
   loading a programmable threshold value in the buffer depth register, and
   wherein if the first bus cycle is a write cycle the fullness indication indicates whether the dual ported buffer has reached the programmable threshold.

16. A computer system having a primary bus and a secondary bus, the primary bus capable of being clocked asynchronously to the secondary bus, the computer system comprising:
   a processor coupled to the primary bus;
   a memory coupled to the primary bus;
   a hard disk system coupled to the secondary bus, the hard disk capable of burst operations with the memory; and
   a bridge coupled between the primary bus and the secondary bus, comprising:
      a dual ported buffer for simultaneous read/write burst operations, the dual ported buffer having a primary interface and a secondary interface;

a primary bus counter coupled to the primary interface and responsive to a primary bus clock for providing an address to a first port of the dual ported buffer, said primary bus counter operable to load a first bus cycle address, said primary bus counter operable to increment the first bus cycle address according to a primary bus data cycle;

a secondary bus counter coupled to the secondary interface and responsive to a secondary bus clock for providing an address to a second port of the dual ported buffer, said secondary bus counter operable to load the first bus cycle address, said secondary bus counter operable to increment the first bus cycle address according to a secondary bus data cycle;

a secondary bus follower counter coupled to the primary interface and responsive to the primary bus clock for providing an address indicative of the address of said secondary bus counter, said secondary bus follower counter operable to load the first bus cycle address, said secondary bus follower counter responsive to a count indication to increment the first bus cycle address;

a comparator operable to generate a difference indication based on the addresses of the primary and secondary bus counters, one of the addresses being a read address and the other of the addresses being a write address;

a gating device responsive to the primary bus clock and operable to receive the difference indication and provide a count indication to the secondary bus follower counter if there is a difference in the addresses compared; and a status generator operable to generate a fullness indication of the dual ported buffer based on a difference between the addresses of said primary bus counter and said secondary bus follower counter, the fullness indication being provided synchronous to said primary bus.

17. The computer system of claim 16, wherein if the first bus cycle is a burst read cycle, the address provided by said primary bus counter is a read address and the address provided by said secondary bus counter is a write address.

18. The computer system of claim 16, wherein if the first bus cycle is a burst write cycle, the primary bus data cycle and the secondary bus data cycle include a plurality of data cycles.

19. The computer system of claim 16, wherein if the first bus cycle is a read cycle the fullness indication indicates data availability in the dual ported buffer.

20. The computer system of claim 16, wherein the bridge further includes:

a buffer depth register coupled to said status generator operable to store a programmable threshold value, and wherein if the first bus cycle is a write cycle the fullness indication indicates whether the dual ported buffer has reached the programmable threshold.

* * * * *

UNITED STATES PATENT AND TRADEMARK OFFICE
CERTIFICATE OF CORRECTION

PATENT NO. : 5,721,839

DATED : 2/24/98

INVENTOR(S) : RYAN A. CALLISON & GREGORY T. CHANDLER

It is certified that error appears in the above-identified patent and that said Letters Patent is hereby corrected as shown below:

COLUMN 18, LINE 38, CLAIM 13, PLEASE DELETE "CLAIM 12" AND INSERT THEREFOR --CLAIM 10--.

Signed and Sealed this

Twenty-eighth Day of April, 1998

Attest:

Attesting Officer

BRUCE LEHMAN

Commissioner of Patents and Trademarks